(12) United States Patent
Murao et al.

(10) Patent No.: US 10,400,292 B2
(45) Date of Patent: Sep. 3, 2019

(54) METHOD FOR OPERATING BLAST FURNACE

(71) Applicant: JFE STEEL CORPORATION, Tokyo (JP)

(72) Inventors: Akinori Murao, Tokyo (JP); Naoki Yamamoto, Tokyo (JP); Tomoyuki Kawashima, Tokyo (JP); Nobuyuki Ooyama, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 15/547,891

(22) PCT Filed: Feb. 22, 2016

(86) PCT No.: PCT/JP2016/000930
§ 371 (c)(1),
(2) Date: Aug. 1, 2017

(87) PCT Pub. No.: WO2016/139912
PCT Pub. Date: Sep. 9, 2016

(65) Prior Publication Data
US 2018/0023152 A1    Jan. 25, 2018

(30) Foreign Application Priority Data

Mar. 2, 2015   (JP) .................. 2015-039967

(51) Int. Cl.
*C21B 5/00*      (2006.01)
*C21B 7/16*      (2006.01)
(Continued)

(52) U.S. Cl.
CPC ........... *C21B 5/003* (2013.01); *C21B 5/00* (2013.01); *C21B 5/001* (2013.01); *C21B 7/00* (2013.01);
(Continued)

(58) Field of Classification Search
CPC .................. C21B 5/00; C21B 7/163
See application file for complete search history.

(56) References Cited

U.S. PATENT DOCUMENTS 5,227,117 A  *  7/1993  Derucki ............... C21B 5/003
                                                    266/182
8,652,395 B2     2/2014  Goedert et al.
(Continued)

FOREIGN PATENT DOCUMENTS

CN    1993483 A     7/2007
CN    103649339 A   3/2014
(Continued)

OTHER PUBLICATIONS

US-20140131929-A1 Espacnet family data for patents including WO-2013011661-A1 (Year: 2014).*
(Continued)

*Primary Examiner* — Tima M. McGuthry-Banks
(74) *Attorney, Agent, or Firm* — Oliff PLC

(57) ABSTRACT

A method for operating a blast furnace includes blowing pulverized coal and oxygen from an upstream lance configured by a double tube. LNG is blown from a downstream lance on the downstream side in a hot air blast direction, oxygen is supplied from the upstream lance, and the pulverized coal whose temperature has been increased by the combustion of the LNG is combusted along with the supplied oxygen or oxygen in an air blast. With respect to a direction perpendicular to the hot air blast and a downstream direction of the hot air blast, a blowing direction of the LNG from the downstream lance with respect to the blast direction ranges from −30° to +45°. A blast pipe circumferential direction angle at a blowing position of the LNG from the downstream lance with respect to where the upstream lance is inserted into a blast pipe ranges from 160° to 200°.

7 Claims, 6 Drawing Sheets

(51) Int. Cl.
  *C21B 7/00* (2006.01)
  *F27B 1/16* (2006.01)
  *F27D 7/02* (2006.01)
  *F27D 17/00* (2006.01)

(52) U.S. Cl.
  CPC .............. *C21B 7/16* (2013.01); *C21B 7/163* (2013.01); *F27B 1/16* (2013.01); *F27D 7/02* (2013.01); *F27D 17/00* (2013.01); *C21B 2005/005* (2013.01); *Y02P 10/283* (2015.11)

(56) References Cited

U.S. PATENT DOCUMENTS

| | | |
|---|---|---|
| 9,410,218 B2 | 8/2016 | Murao et al. |
| 9,650,689 B2 | 5/2017 | Fujiwara et al. |
| 2011/0180978 A1 | 7/2011 | Goedert et al. |
| 2014/0131929 A1* | 5/2014 | Murao .................... C21B 5/003 266/44 |
| 2014/0159287 A1 | 6/2014 | Fujiwara et al. |

FOREIGN PATENT DOCUMENTS

| | | |
|---|---|---|
| CN | 103649340 A | 3/2014 |
| JP | H11-241109 A | 9/1999 |
| JP | 2011-174171 A | 9/2011 |
| JP | 2013-531732 A | 8/2013 |
| JP | 2014-210965 A | 11/2014 |
| KR | 10-2014-0028104 A | 3/2014 |
| RU | 2482193 C2 | 5/2013 |
| SU | 734287 A2 | 5/1980 |
| SU | 986928 A1 | 1/1983 |
| WO | WO-2013011661 A1 * | 7/2011 |
| WO | 2013/011661 A1 | 1/2013 |
| WO | 2013/011662 A1 | 1/2013 |

OTHER PUBLICATIONS

WO-2013011661-A1 machine translation (Year: 2011).*
Nov. 22, 2017 Search Report issued in European Patent Application No. 16758612.2.
May 10, 2016 International Search Report issued in International Patent Application No. PCT/JP2016/000930.
Sep. 5, 2017 International Preliminary Report on Patentability issued in International Patent Application No. PCT/JP2016/000930.
Sep. 21, 2018 Office Action issued in Russian Patent Application No. 2017129914.
Dec. 12, 2018 Office Action issued in Korean Patent Application No. 10-2017-7024451.
Nov. 14, 2018 Office Action issued in Chinese Patent Application No. 201680013032.2.

* cited by examiner

METHOD FOR OPERATING BLAST FURNACE

TECHNICAL FIELD

The present invention relates to a method for operating a blast furnace with which the combustion temperature is increased by blowing pulverized coal from a tuyere of a blast furnace, thereby achieving an improvement of productivity and a reduction in $CO_2$ emissions.

BACKGROUND ART

In recent years, global warming due to an increase in carbon dioxide emissions has become a problem, and controlling $CO_2$ emissions is an important issue also in the steel industry. In response to this, the operation with a low reduction agent ratio (abbreviated as low RAR, total amount of a reducing agent blown from a tuyere and coke charged from a top of a furnace per manufacture of a ton of pig iron) has been promoted strongly in the recent blast furnace operations. Since coke charged from a top of a furnace and pulverized coal blown from a tuyere are mainly used as a reducing agent in a blast furnace, and in order to achieve a low reduction agent ratio, and eventually, control carbon dioxide emissions, a measure to replace coke or the like with a reducing agent having a high hydrogen content ratio, such as LNG (Liquefied Natural Gas) and heavy oil, is effective. In PTL 1 described below, a lance from which a fuel is blown through a tuyere is configured by a triple tube, pulverized coal is blown from an inner tube of the triple tube lance, LNG is blown from a gap between the inner tube and an intermediate tube, oxygen is blown from a gap between the intermediate tube and an outer tube, and LNG is combusted on ahead, so that the temperature of the pulverized coal is increased, and the combustion efficiency of the pulverized coal is improved. In addition, in PTL 2 described below, oxygen is blown from a single tube lance arranged in a blast pipe (blowpipe) to the central part of high-temperature air flowing in the blast pipe, and the temperature of oxygen is increased to several hundred degrees C., and moreover, pulverized coal is blown from a lance arranged so as to penetrate a tuyere, and the pulverized coal is brought into contact with heat oxygen of several hundred degrees C., so that the temperature increase of the pulverized coal is improved, and the combustion efficiency of the pulverized coal is improved.

CITATION LIST

Patent Literature

PTL 1: JP 2011-174171 A
PTL 2: JP 2013-531732 A

SUMMARY OF INVENTION

Technical Problem

However, as described in PTL 1, when the pulverized coal, LNG, and oxygen are blown from the triple tube lance, LNG is combusted ahead of the pulverized coal because LNG is easy to be combusted, as it is called, flammable, oxygen blown from the lance is used by the combustion of LNG, the contacting property between oxygen and the pulverized coal is deteriorated, and the combustion efficiency may be decreased. Moreover, since the outside diameter of the triple tube lance is large, the triple tube lance sometimes cannot be inserted into the existing lance insertion through hole, and in such a case, the inside diameter of the lance insertion through hole needs to be made larger. Furthermore, since LNG is flammable and is rapidly combusted, when LNG is rapidly combusted at an end of the lance, the temperature of the end of the lance is increased, and wear damage, such as a crack and erosion, may be generated in the end of the lance. When such wear damage is generated in the end of the lance, backfire, clogging of the lance, or the like may be induced. In addition, as described in PTL 2, when the pulverized coal is blown from an end of the tuyere, and the pulverized coal is brought into contact with heat oxygen, the temperature increase of the pulverized coal is improved, but the pulverized coal is blown into a raceway quickly, and thus, there is no time for the pulverized coal to be combusted in the blast pipe and the tuyere, and the combustion efficiency of the pulverized coal may not be improved as the result.

The present invention was made in view of the problems as described above, and an object of the present invention is to provide a method for operating a blast furnace with which the combustion efficiency of a solid fuel, such as pulverized coal, is improved, thereby making it possible to improve productivity and reduce $CO_2$ emissions.

Solution to Problem

In order to solve the above-described problems, according to one mode of the present invention, a method for operating a blast furnace including: when hot air is blown into a blast furnace from a blast pipe through a tuyere, using a double tube as an upstream lance for blowing a solid fuel into the blast pipe; blowing one of the solid fuel and combustion-supporting gas from one of an inner tube of the upstream lance and a gap between the inner tube and an outer tube, and blowing the other of the solid fuel and the combustion-supporting gas from the other of the inner tube and the gap between the inner tube and the outer tube; disposing a downstream lance on a downstream side in a blast direction of the hot air from a blowing end part of the upstream lance; and blowing flammable gas from the downstream lance is provided.

Examples of the solid fuel of the present invention include pulverized coal.

In addition, the combustion-supporting gas of the present invention is defined as gas having an oxygen concentration of at least 50 vol % or more.

In addition, the flammable gas used in the present invention is gas having combustibility higher than pulverized coal literally, and, in addition to hydrogen, city gas, LNG, and propane gas containing hydrogen as a main component, converter gas, blast furnace gas, coke-oven gas, and the like generated in a steel mill can be applied. Moreover, shale gas equivalent to LNG can also be used. The shale gas is natural gas obtained from a shale stratum, and is called an unconventional natural gas resource because of being produced in a place that is not a conventional gas field. Flammable gas, such as city gas, is ignited/combusted very rapidly, flammable gas having high hydrogen content has high combustion calorie, and furthermore, flammable gas is advantageous in air permeability and heat balance of a blast furnace because of not containing ash unlike pulverized coal.

Advantageous Effects of Invention

In a method for operating a blast furnace of the present invention, a solid fuel and combustion-supporting gas are blown from an upstream lance configured by a double tube, and flammable gas is blown from a downstream lance on a downstream side in a hot air blast direction, so that oxygen to be used for combustion of the flammable gas is supplied from the upstream lance, and the solid fuel whose temperature has been increased by the combustion of the flammable gas is combusted along with the supplied oxygen or oxygen in an air blast. Therefore, the combustion efficiency of the solid fuel is improved, and accordingly, it makes possible to efficiently improve productivity and reduce $CO_2$ emissions.

DESCRIPTION OF EMBODIMENTS

Figure 1:
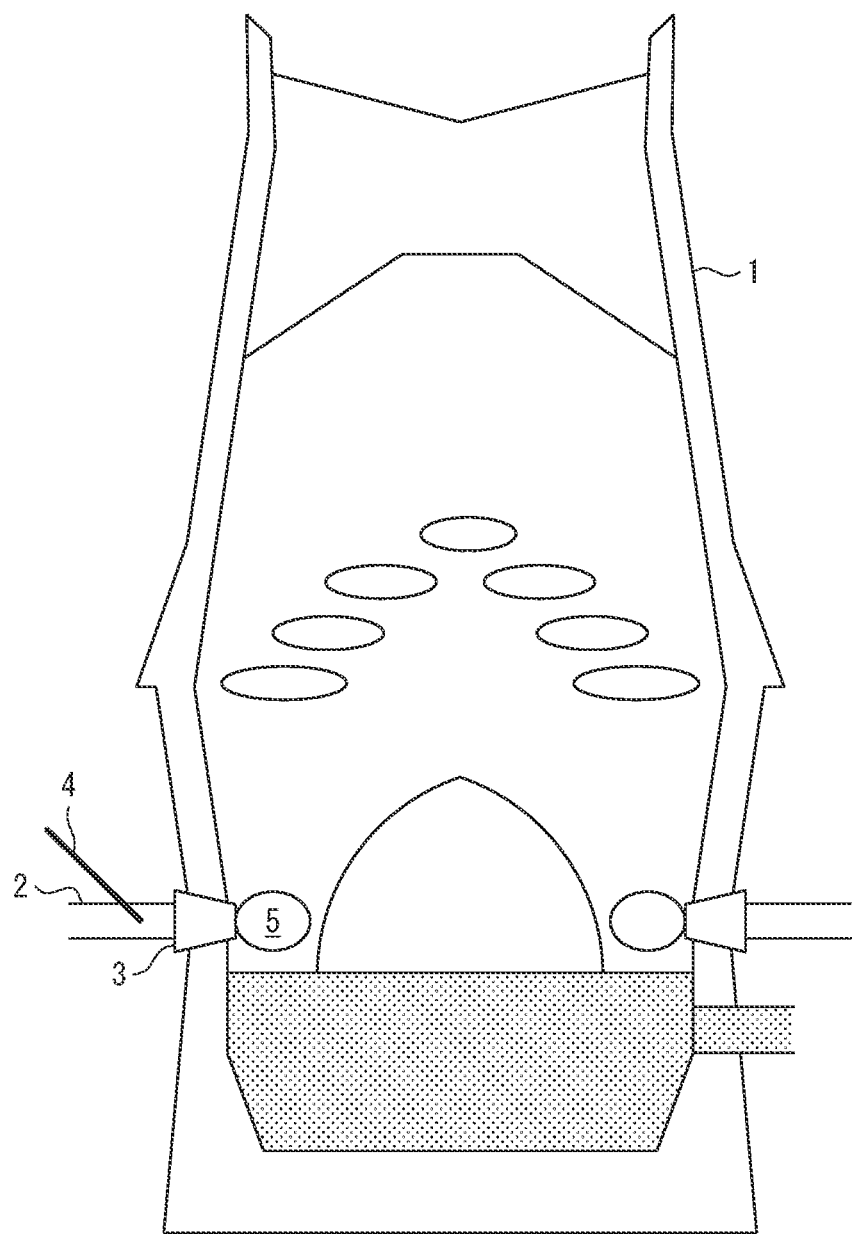
FIG. 1 is a vertical cross-sectional view illustrating one embodiment of a blast furnace to which a method for operating a blast furnace of the present invention is applied.

Next, one embodiment of a method for operating a blast furnace of the present invention will be described with reference to the drawings. FIG. 1 is an overall view of a blast furnace to which the method for operating a blast furnace of the present embodiment is applied. As illustrated in the drawing, a blast pipe 2 for blasting hot air is connected to a tuyere 3 of a blast furnace 1, and a lance 4 is arranged so as to penetrate the blast pipe 2. As the hot air, air is used. A combustion space called a raceway 5 exists at a coke deposit layer in front of the tuyere 3 in a hot air blast direction, and reduction of iron ore, that is, manufacture of pig iron is primarily performed in the combustion space. Although, in the drawing, only one lance 4 is inserted into the blast pipe 2 on the left side in the drawing, as is well known, the lance 4 can be set to be inserted into any of the blast pipe 2 and the tuyeres 3 circumferentially disposed along the furnace wall. In addition, the number of lances per tuyere is not limited to one, and two or more lances can be inserted. In addition, as the types of lances, starting with a single tube lance, a double tube lance and a bundle of a plurality of lances can be applied. However, it is difficult to insert a triple tube lance into the present lance insertion through hole of the blast pipe 2. Moreover, in the following description, the lance 4 that penetrates the blast pipe 2 is also called an upstream lance.

For example, when pulverized coal as a solid fuel is blown from the lance 4, the pulverized coal is blown along with carrier gas, such as $N_2$. When only the pulverized coal as a solid fuel is blown from the lance 4, a volatile matter and fixed carbon of the pulverized coal which has passed through the tuyere 3 from the lance 4 and has been blown into the raceway 5 are combusted along with coke, and an aggregate of carbon and ash generally called char, which has not combusted and is left, is discharged from the raceway 5 as incombusted char. Since the incombusted char is accumulated in the furnace, thereby deteriorating the air permeability in the furnace, it is required that the pulverized coal is combusted in the raceway 5 as much as possible, that is, the combustibility of the pulverized coal is improved. Since the hot air speed in front of the tuyere 3 in the hot air blast direction is approximately 200 m/sec and the existence region of oxygen in the raceway 5 from an end of the lance 4 is approximately 0.3 to 0.5 m, it is necessary to increase the temperature and improve contact efficiency with oxygen (diffusibility) of pulverized coal particles virtually at a level of $\frac{1}{1000}$ sec.

The pulverized coal that has been blown into the raceway 5 from the tuyere 3 is first heated by heat transfer by convection from an air blast, and furthermore, the particle temperature is drastically increased by heat transfer by radiation and conductive heat transfer from a flame in the raceway 5, heat decomposition is started from the time when the temperature has been increased to 300° C. or more, the volatile matter is ignited to generate a flame, and the combustion temperature reaches 1400 to 1700° C. When the volatile matter is discharged, the pulverized coal becomes the above-described char. The char is primarily fixed carbon, and thus, a reaction called a carbon dissolution reaction also occurs along with a combustion reaction. At this time, an increase in the volatile matter of the pulverized coal to be blown into the blast pipe 2 from the lance 4 facilitates ignition of the pulverized coal, an increase in the combustion amount of the volatile matter increases the temperature increase speed and the maximum temperature of the pulverized coal, and an increase in the diffusibility and the temperature of the pulverized coal increases the reaction speed of the char. More specifically, it is considered that, as the volatile matter expands by gasification, the pulverized coal diffuses and the volatile matter is combusted, and the pulverized coal is rapidly heated and its temperature is rapidly increased by combustion heat thereof. In contrast, when, for example, LNG as flammable gas is blown into the blast pipe 2 from the lance 4 along with the pulverized coal, it is considered that LNG is in contact with oxygen in the air blast, LNG is combusted, and the pulverized coal is rapidly heated and its temperature is rapidly increased by combustion heat thereof, thereby facilitating ignition of the pulverized coal.

In the present embodiment, pulverized coal as a solid fuel and oxygen (pure oxygen) as combustion-supporting gas were used. In addition, a double tube lance is used for the upstream lance 4, one of the pulverized coal and oxygen is blown from an inner tube of the upstream lance 4 configured by the double tube lance, and the other of the pulverized coal and oxygen is blown from a gap between the inner tube and an outer tube. Regarding the blowing from the double tube lance, the pulverized coal may be blown from the inner tube and oxygen may be blown from the gap between the inner tube and the outer tube, or oxygen may be blown from the inner tube and the pulverized coal may be blown from the gap between the inner tube and the outer tube. Here, the pulverized coal was blown from the inner tube of the upstream lance 4 configured by the double tube lance, and oxygen was blown from the gap between the inner tube and the outer tube.

Figure 2:
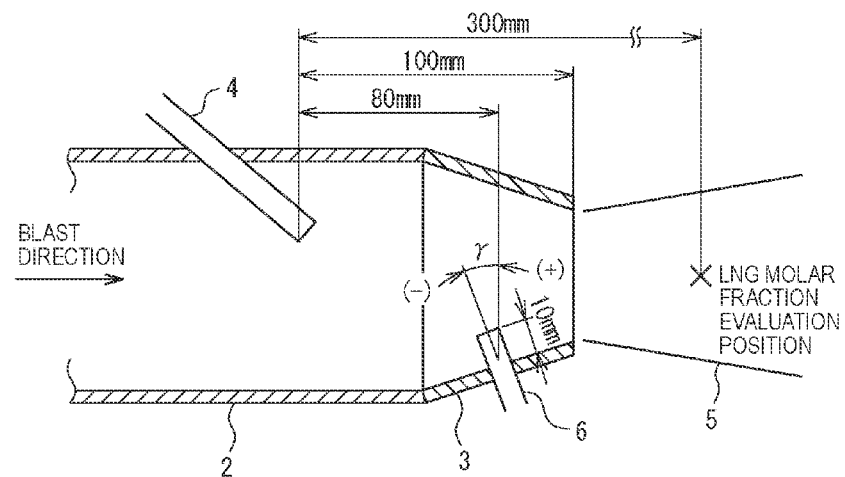
FIG. 2 is a vertical cross-sectional view illustrating angle states of an upstream lance and a downstream lance in a blast pipe and a tuyere of FIG. 1.
Figure 3:
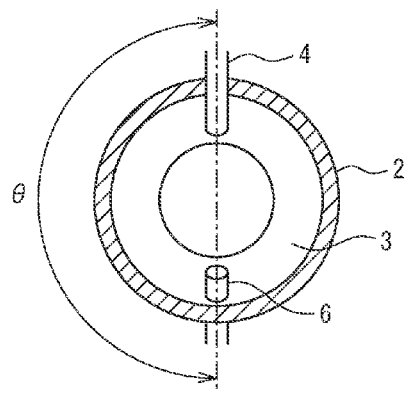
FIG. 3 is a vertical cross-sectional view illustrating positions of the upstream lance and the downstream lance in the blast pipe and the tuyere of FIG. 1.

In the present embodiment, as illustrated in FIG. 2, a downstream lance 6 is disposed on the downstream side in the hot air blast direction with respect to the upstream lance 4, and LNG as flammable gas is blown from the downstream lance 6. Specifically, the downstream lance 6 is disposed so as to penetrate the tuyere (member) 3. The center position of a blowing end part of the above-described upstream lance 4 was set to be a position of, for example, 100 mm from an end part of the tuyere 3 in the blast direction in the opposite direction of the blast direction, and a distance from the center position of the blowing end part of the upstream lance 4 to the center position of a tuyere-penetrating part of the downstream lance 6 was set to be, for example, 80 mm. In addition, as illustrated in FIG. 2 and FIG. 3, the upstream lance 4 of the present embodiment is disposed so as to penetrate the uppermost part of the blast pipe 2 toward the central axis of the blast pipe 2. In contrast, as clearly illustrated in FIG. 3, the downstream lance 6 was made to penetrate the tuyere 3 at a position of 160° to 200° in terms of a circumferential direction angle θ of the blast pipe 2 from a position where the upstream lance 4 is disposed. In other words, the downstream lance 6 was disposed at a position opposed to the upstream lance 4. It is to be noted that an inserting length from the center position of the tuyere-penetrating part of the downstream lance 6 was 10 mm.

Here, the density of the pulverized coal used was 1400 kg/m$^3$, N$_2$ was used as carrier gas, and the pulverized coal blowing condition was 1100 kg/h. In addition, the oxygen blowing condition was 100 Nm$^3$/h, and, regarding the blast condition from the blast pipe 2, the blast temperature was 1200° C., the flow volume was 12000 Nm$^3$/h, the flow speed was 150 m/s, and air was used. Regarding the LNG blowing condition, the flow volume was 350 Nm$^3$/h and the flow speed was 146 m/s.

Figure 4:
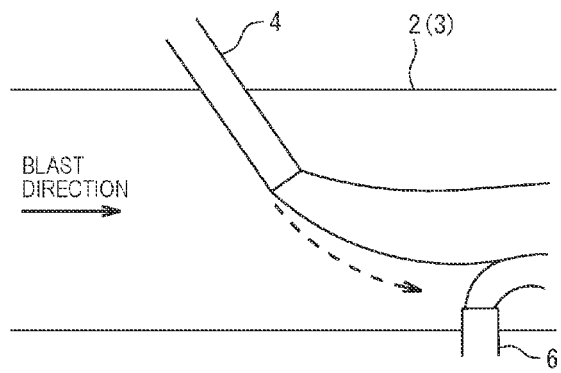
FIG. 4 is an illustration diagram of the action of the upstream lance and the downstream lance of FIG. 2.

The main stream of the pulverized coal (including oxygen and carrier gas) blown from the upstream lance 4 flows by the hot air blast, as indicated by the solid line in FIG. 4. However, powder particles having large mass, that is, having large inertial force also exist in the pulverized coal, and such pulverized coal having large mass flows to the front in a blowing direction away from the main stream of the pulverized coal, as indicated by the dashed line (dashed arrow) in FIG. 4. In order to ensure a temperature increasing effect by the combustion of the LNG for the pulverized coal away from the main stream of the pulverized coal in this manner, the position of the downstream lance 6 relative to the position of the upstream lance 4 was set to be 160° to 200° in terms of the blast pipe circumferential direction angle θ such that the downstream lance 6 is opposed to the upstream lance 4.

Figure 5:
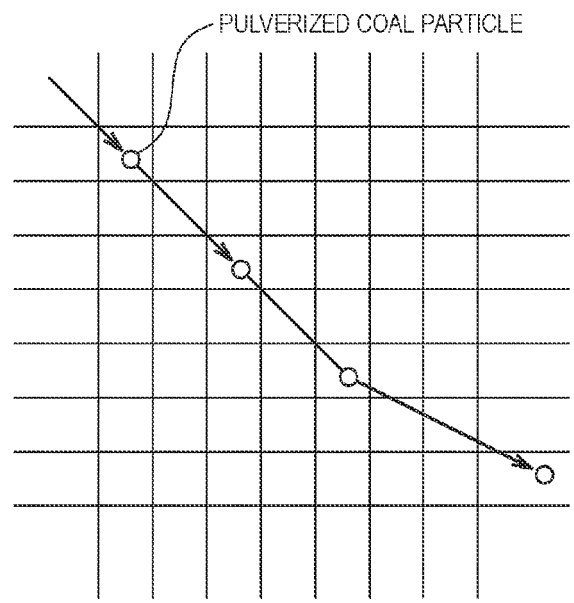
FIG. 5 is an illustration diagram of a LNG molar fraction.

In order to prove this, the LNG molar fraction around the pulverized coal was evaluated by variously changing the blast pipe circumferential direction angle of the downstream lance 6 relative to the upstream lance 4 and performing a fluid analysis in the raceway 5 with a computer using general-purpose fluid analysis software. As illustrated in FIG. 2, the evaluation position of the LNG molar fraction was set to be a position of 300 mm from the center position of the blowing end part of the upstream lance 4 in the hot air blast direction, i.e. a position in the raceway 5 of 200 mm from the end part of the tuyere 3 in the blast direction. In the fluid analysis with the computer, as illustrated in FIG. 5, meshes were generated for fluid simulation, and the molar fraction of LNG in gas of a mesh in which pulverized coal particles exist was defined as the molar fraction of the LNG in contact with the pulverized coal particles. The evaluation was performed by an average value of the LNG molar fraction in gas in contact with all pulverized coal particles at the evaluation point of 300 mm from the center position of the blowing end part of the upstream lance 4 in the blast direction.

Figure 6:
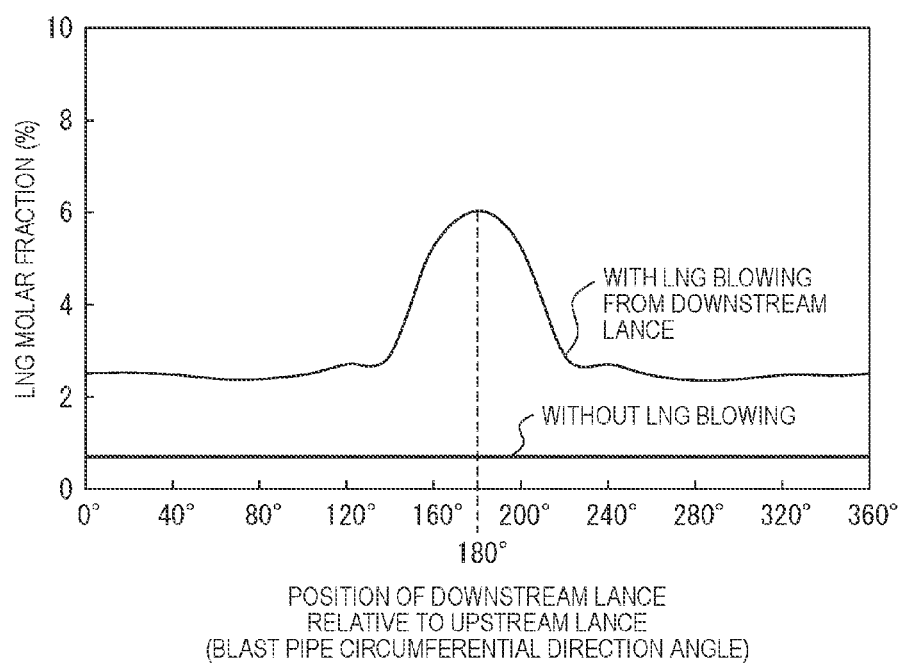
FIG. 6 is an illustration diagram of the LNG molar fraction when a blowing position of flammable gas is changed in a blast pipe circumferential angle direction.

FIG. 6 illustrates the LNG molar fraction in gas in contact with the pulverized coal particles when the blast pipe circumferential direction angle of the downstream lance 6 relative to the upstream lance 4 is changed. At this time, the blowing direction of the LNG blown from the downstream lance 6 was set to be toward the center of the tuyere 3 (or the blast pipe 2) in the radial direction and perpendicular to the hot air blast direction (0° with respect to the hot air blast direction, described below). It is to be noted that, as a comparative example, a curved line (straight line) when air to which 350 Nm$^3$/h of LNG is added is blasted without blowing LNG from the downstream lance, so that the LNG molar fraction in gas in contact with the pulverized coal particles is constant, is also illustrated in the drawing, as without LNG blowing from the downstream lance 6. As is clear from the drawing, the LNG molar fraction in gas in contact with the pulverized coal particles is increased in a range where the position of the downstream lance 6 relative to the upstream lance 4 is 160° to 200° in terms of the blast pipe circumferential direction angle θ, and becomes maximum when the position of the downstream lance 6 relative to the upstream lance 4 is 180° in terms of the blast pipe circumferential direction angle θ. As described above, this means that the downstream lance 6 is disposed so as to be opposed to the upstream lance 4, so that LNG blown from the downstream lance 6 is sufficiently supplied to the pulverized coal flow blown from the upstream lance 4 including the pulverized coal away from the main stream, and it is considered that the combustibility of the pulverized coal in the raceway 5 is improved as the result.

Figure 7:
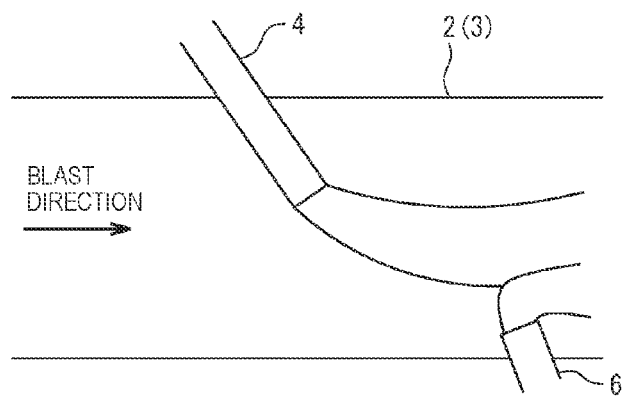
FIG. 7 is an illustration diagram of a blowing direction of the flammable gas blown from the downstream lance with respect to a blast direction.
Figure 8:
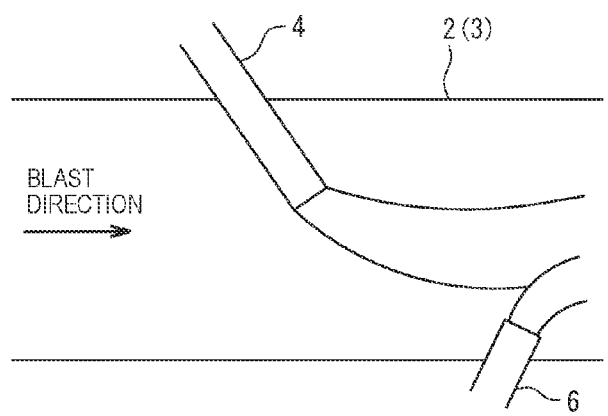
FIG. 8 is an illustration diagram of the blowing direction of the flammable gas blown from the downstream lance with respect to the blast direction.
Figure 9:
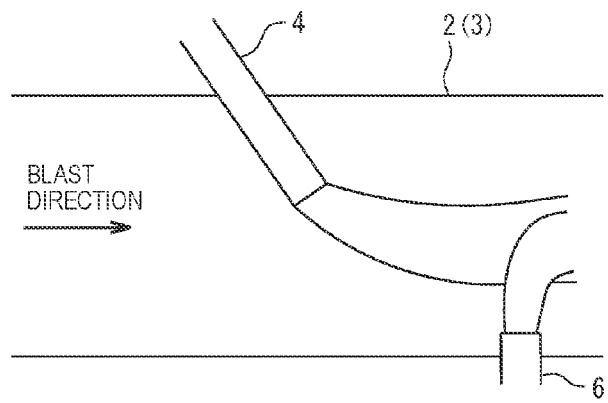
FIG. 9 is an illustration diagram of the blowing direction of the flammable gas blown from the downstream lance with respect to the blast direction.

In addition, it is considered that the blowing direction of the LNG blown from the downstream lance 6 with respect to the blast direction also affects the LNG molar fraction in gas in contact with the pulverized coal particles, i.e. the combustibility of the pulverized coal in the raceway 5. For example, when the blowing direction of the LNG blown from the downstream lance 6 with respect to the hot air blast direction, which is perpendicular to the hot air blast direction, is designated as 0°, and the blowing directions of the LNG (angle γ in FIG. 2) which are the downstream direction and the upstream direction therefrom in the hot air blast direction are designated as positive and negative, respectively, when the blowing direction of the LNG with respect to the blast direction is negative, that is, the upstream direction as illustrated in FIG. 7, the LNG flow is swept away by the hot air blast and may not reach the pulverized coal flow blown from the upstream lance 4. In addition, also when the blowing direction of the LNG blown from the downstream lance 6 with respect to the blast direction is positive, that is, the downstream direction as illustrated in FIG. 8, the LNG flow is swept away by the hot air blast and may not reach the pulverized coal flow blown from the upstream lance 4. Therefore, when the blowing direction of the LNG blown from the downstream lance 6 with respect to the blast direction is 0°, that is, perpendicular to the hot air blast direction or the vicinity thereof as illustrated in FIG. 9, the LNG flow can reach the pulverized coal flow blown from the upstream lance 4 against the hot air blast. Therefore, it is considered that the blowing direction of the LNG with respect to the hot air blast direction may be slightly leaned in any of the positive and negative directions with the perpendicularity to the blast direction as a center.

In order to prove this, the LNG molar fraction around the pulverized coal was evaluated by variously changing the blowing direction of the LNG blown from the downstream lance 6 with respect to the hot air blast direction and performing, in the same manner as the above, a fluid analysis in the raceway 5 with a computer using general-purpose fluid analysis software. Similarly, the evaluation position of the LNG molar fraction was set to be a position of 300 mm from the center position of the blowing end part of the upstream lance 4 in the hot air blast direction, i.e. a position in the raceway 5 of 200 mm from the end part of the tuyere 3 in the blast direction. In addition, also in the fluid analysis with the computer, in the same manner as the above, the molar fraction of LNG in gas of a mesh in which pulverized coal particles exist was defined as the molar fraction of the LNG in contact with the pulverized coal particles, and the evaluation was performed by an average value of the LNG molar fraction in gas in contact with all pulverized coal particles at the evaluation point of 300 mm from the center position of the blowing end part of the upstream lance 4 in the blast direction.

Figure 10:
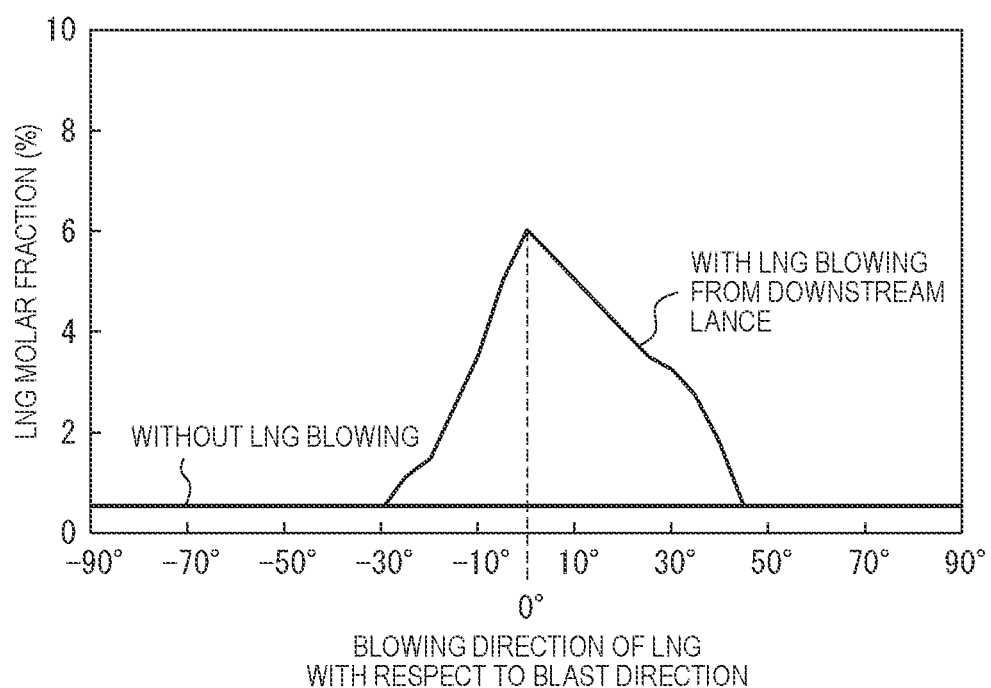
FIG. 10 is an illustration diagram of the LNG molar fraction when the blowing direction of the flammable gas is changed with respect to the blast direction.

FIG. 10 illustrates the LNG molar fraction in gas in contact with the pulverized coal particles when the blowing direction of the LNG blown from the downstream lance 6 with respect to the hot air blast direction is changed. At this time, the position of the downstream lance 6 relative to the upstream lance 4 was 180° in terms of the blast pipe circumferential direction angle, that is, the upstream lance 4 and the downstream lance 6 were disposed so as to be opposed to each other. In addition, LNG from the downstream lance 6 was blown toward the center of the tuyere 3 (or the blast pipe 2) in the radial direction. It is to be noted that, as a comparative example, a curved line (straight line) when air to which 350 $Nm^3/h$ of LNG is added is blasted without blowing LNG from the downstream lance, so that the LNG molar fraction in gas in contact with the pulverized coal particles is constant is also illustrated in the drawing, as without LNG blowing from the downstream lance 6. As is clear from the drawing, the LNG molar fraction of the pulverized coal particles is increased in a range from −30° on the negative side, i.e. in the upstream direction in the blast direction to 45° on the positive side, i.e. in the downstream direction in the blast direction in terms of the blowing direction of the LNG blown from the downstream lance 6 with respect to the hot air blast direction, and becomes maximum when the blowing direction of the LNG blown from the downstream lance 6 with respect to the hot air blast direction is perpendicular to the blast direction, i.e. 0°. As described above, this means that the blowing direction of the LNG is set to be a direction perpendicular to the hot air blast direction or the vicinity thereof, so that LNG blown from the downstream lance 6 is sufficiently supplied to the pulverized coal flow blown from the upstream lance 4, and it is considered that the combustibility of the pulverized coal in the raceway 5 is improved as the result.

Figure 11:
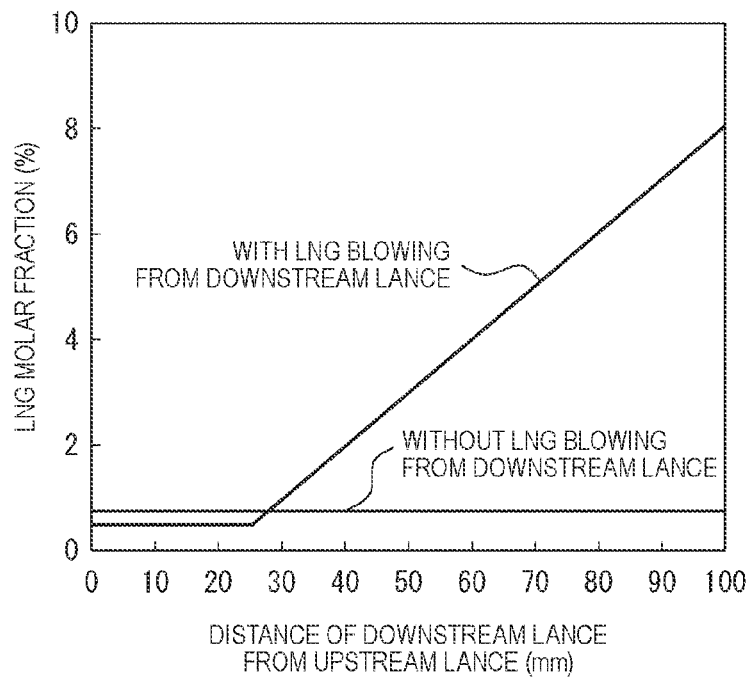
FIG. 11 is an illustration diagram of the LNG molar fraction when a distance of the downstream lance from the upstream lance is changed.

Next, in order to confirm the mixability of the pulverized coal flow and the LNG flow, which was considered in FIG. 4, the LNG molar fraction around the pulverized coal was evaluated by variously changing a distance of the downstream lance 6 from the upstream lance 4 and performing, in the same manner as the above, a fluid analysis in the raceway 5 with a computer using general-purpose fluid analysis software. The evaluation of the LNG molar fraction is the same as the above, the position of the downstream lance 6 relative to the upstream lance 4 is 180° in terms of the blast pipe circumferential direction angle, the blowing direction of the LNG blown from the downstream lance 6 with respect to the hot air blast direction is perpendicular to the blast direction, i.e. 0°, and other conditions are the same as the above. FIG. 11 illustrates the test result. In the drawing, as a comparative example, a curved line (straight line) when air to which 350 $Nm^3/h$ of LNG is added is blasted without blowing LNG from the downstream lance, so that the LNG molar fraction in gas in contact with the pulverized coal particles is constant is also illustrated, as without LNG blowing from the downstream lance 6. As is clear from the drawing, when the distance of the downstream lance 6 from the upstream lance 4 is 27 mm or more, the LNG molar fraction when LNG is blown from the downstream lance 6 exceeds the LNG molar fraction when LNG is not blown from the downstream lance 6, and the LNG molar fraction is linearly increased as the distance is increased. It is considered that this is because the pulverized coal flow from the upstream lance 4 and the LNG flow from the downstream lance 6 were mixed by keeping the downstream lance 6 away from the upstream lance 4 to some extent. However, in the operation, when the distance of the downstream lance 6 from the upstream lance 4 exceeds 80 mm, problems arise, for example, the downstream lance 6 gets close to the tuyere to cause erosion, and the pressure in the blast pipe 2 is increased because the pulverized coal is combusted before reaching the position of the downstream lance 6, thereby becoming incapable of blowing LNG from the downstream lance 6. Thus, the distance of the downstream lance 6 from the upstream lance 4 is preferably 27 mm to 80 mm, and the optimal value is 80 mm.

Figure 12:
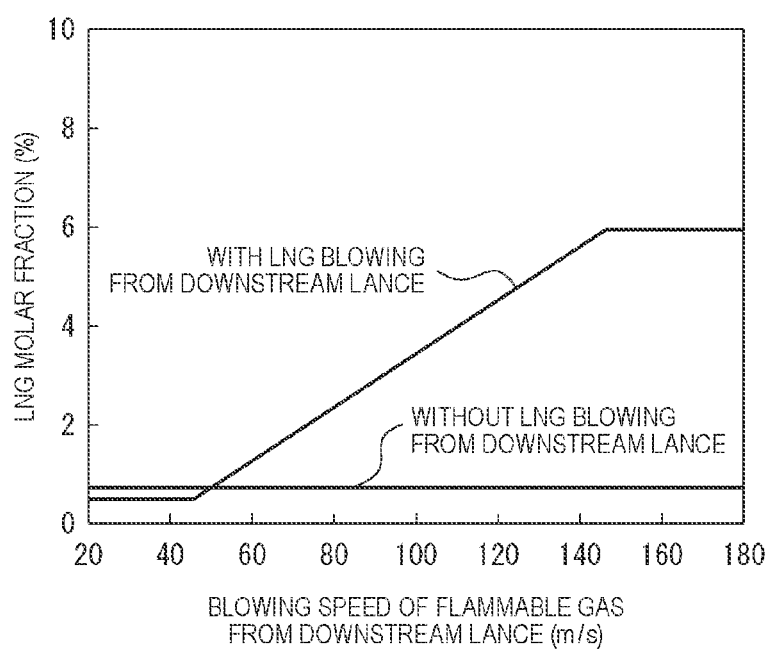
FIG. 12 is an illustration diagram of the LNG molar fraction when a blowing speed of the flammable gas from the downstream lance is changed.

In the same manner, the LNG molar fraction around the pulverized coal was evaluated by variously changing a blowing speed of the flammable gas from the downstream lance 6 and performing, in the same manner as the above, a fluid analysis in the raceway 5 with a computer using general-purpose fluid analysis software. The evaluation of the LNG molar fraction is the same as the above, the position of the downstream lance 6 relative to the upstream lance 4 is 180° in terms of the blast pipe circumferential direction angle, the blowing direction of the LNG blown from the downstream lance 6 with respect to the hot air blast direction is perpendicular to the blast direction, i.e. 0°, and other conditions are the same as the above. FIG. 12 illustrates the test result. In the drawing, as a comparative example, a curved line (straight line) when air to which 350 $Nm^3/h$ of LNG is added is blasted without blowing LNG from the downstream lance, so that the LNG molar fraction in gas in contact with the pulverized coal particles is constant is also illustrated, as without LNG blowing from the downstream lance 6. As is clear from the drawing, when the blowing speed of the flammable gas from the downstream lance 6 is 50 m/s or more, the LNG molar fraction when LNG is blown from the downstream lance 6 exceeds the LNG molar fraction when LNG is not blown from the downstream lance 6, and the LNG molar fraction is linearly increased as the blowing speed of the flammable gas is increased and is saturated at the blowing speed of the flammable gas of 146 m/s or more. It is considered that this is because the pulverized coal flow from the upstream lance 4 and the LNG flow from the downstream lance 6 were mixed in the vicinity of the center of the blast pipe by making the blowing speed of the flammable gas from the downstream lance 6 large to some extent. However, when the blowing speed of the flammable gas from the downstream lance 6 becomes large, a pressure loss, a cost increase, and the like are not preferable in the operation, and thus, the blowing speed of the flammable gas from the downstream lance 6 is preferably 50 m/s to 146 m/s, and the optimal value is 146 m/s.

Therefore, by satisfying these conditions, the pulverized coal is in contact with oxygen at the end of the lance, so that the combustion proceeds to some extent, furthermore, the pulverized coal is in contact with LNG by the LNG blowing from the downstream lance 6, so that the temperature increase of the pulverized coal becomes fast, and the combustibility of the pulverized coal can be improved. In addition, the rapid combustion of the pulverized coal at the end of the lance is controlled, and thus, a crack and erosion of the end of the lance due to heat can be prevented.

In order to confirm the effect of the method for operating a blast furnace, in a blast furnace having 38 tuyeres and an inner volume of 5000 m$^3$, under the conditions that a desired production volume of hot metal was 11500 t/day, a pulverized coal ratio was 150 kg/t-hot metal, the distance of the downstream lance 6 from the upstream lance 4 was 80 mm, and the blowing speed of the flammable gas from the downstream lance 6 was 146 m/s and the above-described blast condition, pulverized coal blowing condition, and oxygen blowing condition were set, the operation was performed for three days in two ways, the case where LNG was blown from the downstream lance 6 and the case where a downstream lance was not used (LNG was added to air to be blasted), respectively, and the effect was confirmed by recording changes in average coke ratios (kg/t-hot metal). It is to be noted that the blowing direction of the LNG blown from the downstream lance 6 with respect to the hot air blast direction was perpendicular to the hot air blast direction, and the position of the downstream lance 6 relative to the upstream lance 4 was 180° in terms of the blast pipe circumferential direction angle. As a result, the coke ratio when a downstream lance was not used was 370 kg/t-hot metal, whereas the coke ratio when LNG was blown from the downstream lance 6 was 368 kg/t-hot metal. Accordingly, by blowing LNG from the downstream lance 6, the combustion efficiency of the pulverized coal was improved, and the coke ratio could be reduced. In addition, it was confirmed that there was not wear damage, such as a crack and erosion, in the end part of the upstream lance 4 configured by the double tube lance.

As just described, in the method for operating a blast furnace of the present embodiment, the pulverized coal as a solid fuel and oxygen as combustion-supporting gas are blown from the upstream lance 4 configured by a double tube, and LNG as flammable gas is blown from the downstream lance 6 on the downstream side in the hot air blast direction, so that oxygen to be used for the combustion of the LNG is supplied from the upstream lance 4, and the pulverized coal whose temperature has been increased by the combustion of the LNG is combusted along with the supplied oxygen or oxygen in the air blast. Therefore, the combustion efficiency of the pulverized coal is improved, and accordingly, it makes possible to efficiently improve productivity and reduce $CO_2$ emissions.

In addition, when a direction perpendicular to the hot air blast direction is designated as 0°, and the downstream direction and the upstream direction therefrom in the hot air blast direction are designated as positive and negative, respectively, the blowing direction of the LNG from the downstream lance 6 with respect to the blast direction ranges from −30° to +45°. Accordingly, the combustion efficiency of the pulverized coal is surely improved.

In addition, a blowing position of the LNG from the downstream lance 6 with reference to a position at which the upstream lance 4 is inserted into the blast pipe 2 ranges from 160° to 200° in terms of the blast pipe circumferential direction angle. Accordingly, the combustion efficiency of the pulverized coal is surely improved.

In addition, the distance of the downstream lance from the upstream lance is set to be 27 mm to 80 mm, so that the combustion efficiency of the pulverized coal is surely improved.

In addition, the blowing speed of the flammable gas from the downstream lance is set to be 50 m/s to 146 m/s, so that the combustion efficiency of the pulverized coal is surely improved.

REFERENCE SIGNS LIST 1 blast furnace
2 blast pipe
3 tuyere
4 upstream lance
5 raceway
6 downstream lance

The invention claimed is:

1. A method for operating a blast furnace, in which hot air is blown into a blast furnace from a blast pipe through a tuyere, the method comprising:
 using a double tube as an upstream lance for blowing a solid fuel into the blast pipe;
 blowing one of the solid fuel and a combustion-supporting gas from one of an inner tube of the upstream lance and a gap between the inner tube and an outer tube, and blowing the other of the solid fuel and the combustion-supporting gas from the other of the inner tube and the gap between the inner tube and the outer tube;
 providing a downstream lance on a downstream side in a blast direction of the hot air from a blowing end part of the upstream lance; and
 blowing a flammable gas from the downstream lance, a blowing direction of the flammable gas from the downstream lance ranging from −30° to 0° with respect to a direction perpendicular to the blast direction of the hot air, wherein a downstream direction in the blast direction of the hot air is designated as positive, and an upstream direction in the blast direction of the hot air is designated as negative.

2. The method for operating a blast furnace according to claim 1, wherein the blowing direction of the flammable gas from the downstream lance ranges from 160° to 200° with respect to a blowing direction of the upstream lance.

3. The method for operating a blast furnace according to claim 1, wherein a distance of the downstream lance from the upstream lance is 27 mm to 80 mm.

4. The method for operating a blast furnace according to claim 1, wherein a blowing speed of the flammable gas from the downstream lance is 50 m/s to 146 m/s.

5. The method for operating a blast furnace according to claim 2, wherein a distance of the downstream lance from the upstream lance is 27 mm to 80 mm.

6. The method for operating a blast furnace according to claim 2, wherein a blowing speed of the flammable gas from the downstream lance is 50 m/s to 146 m/s.

7. The method for operating a blast furnace according to claim 3, wherein a blowing speed of the flammable gas from the downstream lance is 50 m/s to 146 m/s.

* * * * *